US012296208B2

(12) United States Patent
Palit et al.

(10) Patent No.: US 12,296,208 B2
(45) Date of Patent: May 13, 2025

(54) EXTINGUISHING DEVICE FOR FITTING ON THE HOUSING OF AN ELECTRICAL UNIT, ON A MONUMENT IN THE CABIN OF AN AIRCRAFT OR IN A CAVITY IN THE STRUCTURE OF AN AIRCRAFT

(71) Applicant: Airbus Operations GmbH, Hamburg (DE)

(72) Inventors: Yener Palit, Hamburg (DE); Klaus-Udo Freitag, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 712 days.

(21) Appl. No.: 17/385,757

(22) Filed: Jul. 26, 2021

(65) Prior Publication Data

US 2022/0023688 A1 Jan. 27, 2022

(30) Foreign Application Priority Data

Jul. 27, 2020 (DE) ..................... 10 2020 119 705.5

(51) Int. Cl.
*A62C 3/08* (2006.01)
*A62C 35/02* (2006.01)
(Continued)

(52) U.S. Cl.
CPC ................ *A62C 3/08* (2013.01); *A62C 35/02* (2013.01); *A62C 37/04* (2013.01); *A62C 37/40* (2013.01); *G08B 17/06* (2013.01)

(58) Field of Classification Search
CPC .. A62C 3/08; A62C 3/16; A62C 35/02; A62C 37/04; A62C 37/40
See application file for complete search history.

(56) References Cited

U.S. PATENT DOCUMENTS 7,456,750 B2 * 11/2008 Popp ...................... B64D 37/32 269/61
7,876,230 B2 * 1/2011 Popp ...................... B64D 37/32 269/61
(Continued)

FOREIGN PATENT DOCUMENTS

CN 109475764 A 3/2019
CN 209464523 U 10/2019
(Continued)

OTHER PUBLICATIONS

Chinese Office Action for Application No. 202110823463 dated Nov. 9, 2022.
(Continued)

*Primary Examiner* — Joseph A Greenlund
(74) *Attorney, Agent, or Firm* — KDW Firm PLLC

(57) ABSTRACT

An extinguishing device for an electrical unit on an aircraft cabin monument or in an aircraft structure cavity, a combination of a holder and an extinguishing device and systems formed by extinguishing devices and a control unit and by combinations of an extinguishing device and a holder and a control unit. The extinguishing device has a base element for a holder. An extinguishing agent container has a casing and holds an extinguishing agent. A triggering device is connected to the extinguishing agent container to act in response to receiving a triggering signal wherein an extinguishing agent is released into the extinguishing device surrounding area. A data transmission device has a data store with an identifier unique to the extinguishing device and connected to the triggering device, the data transmission device for sending a warning signal via a network to a control unit in response to the triggering device receiving the triggering signal.

16 Claims, 2 Drawing Sheets

(51) Int. Cl.
*A62C 37/36* (2006.01)
*A62C 37/40* (2006.01)
*G08B 17/06* (2006.01)

(56) References Cited

U.S. PATENT DOCUMENTS

| | | | | |
|---|---|---|---|---|
| 8,496,067 | B2 * | 7/2013 | Koelewijn | A62C 5/006 169/29 |
| 10,083,587 | B1 * | 9/2018 | Sagert | G08B 25/14 |
| 11,170,621 | B1 * | 11/2021 | Hillery | G08B 17/10 |
| 11,241,599 | B2 * | 2/2022 | Enk | A62C 37/04 |
| 2001/0054964 | A1 | 12/2001 | Popp et al. | |
| 2008/0190627 | A1 * | 8/2008 | Koelewijn | A62C 5/006 169/48 |
| 2012/0285710 | A1 * | 11/2012 | Umehara | A62C 5/006 169/56 |
| 2014/0305668 | A1 * | 10/2014 | Berezovsky | A62C 35/023 169/62 |
| 2017/0050062 | A1 * | 2/2017 | Kirkbride | A62C 37/36 |
| 2017/0109986 | A1 * | 4/2017 | Faubion | G08B 17/113 |
| 2017/0228993 | A1 * | 8/2017 | Avak | G01S 1/68 |
| 2019/0015688 | A1 * | 1/2019 | Stimek | A62C 3/006 |
| 2019/0022440 | A1 * | 1/2019 | Chattaway | A62C 35/68 |
| 2019/0114891 | A1 * | 4/2019 | Eck | G08B 17/10 |
| 2020/0147426 | A1 * | 5/2020 | Atkinson | H02J 7/0042 |
| 2021/0046346 | A1 * | 2/2021 | Fujiwara | G08B 17/113 |
| 2022/0023688 | A1 * | 1/2022 | Palit | A62C 37/40 |
| 2024/0198150 | A1 * | 6/2024 | Sharma | H01M 10/625 |

FOREIGN PATENT DOCUMENTS

| | | | |
|---|---|---|---|
| CN | 102834144 | A | 12/2019 |
| CN | 110787400 | A | 2/2020 |
| DE | 102 45 831 | A1 | 4/2004 |
| DE | 10 2004 029 655 | A1 | 1/2006 |
| DE | 10 2009 023 422 | A1 | 12/2010 |
| WO | WO 2005/030338 | A1 | 4/2005 |

OTHER PUBLICATIONS

Chinese Office Action for Application No. 202110823463 dated Jun. 8, 2022.

French Office Action for Application No. 2108036 dated Jun. 17, 2022.

Chinese Office Action for Application No. 202110823463 dated Feb. 9, 2023.

* cited by examiner

EXTINGUISHING DEVICE FOR FITTING ON THE HOUSING OF AN ELECTRICAL UNIT, ON A MONUMENT IN THE CABIN OF AN AIRCRAFT OR IN A CAVITY IN THE STRUCTURE OF AN AIRCRAFT

CROSS-REFERENCE TO RELATED APPLICATION

This application claims priority to German Patent Application DE 10 2020 119 705.5 filed Jul. 27, 2020, the entire disclosure of which is incorporated by reference herein.

TECHNICAL FIELD

The disclosure herein relates to an extinguishing device, in particular for fitting on the housing of an electrical unit, on a monument in the cabin of an aircraft or in a cavity in the structure of an aircraft, and also to a combination of an extinguishing device and a holder, to a system comprising an extinguishing device and a control unit and also to a system comprising a control unit and the aforementioned combination.

BACKGROUND

In particular in the case of aircraft, there is the problem of the early and reliable detection of fires, or rather states of parts of the aircraft that are very likely to cause a fire, and the initiation of countermeasures to prevent a fire from being able to spread within the aircraft.

It is known in this respect from DE 102 45 831 A1 to provide within cavities in the structure in an aircraft, that is to say for example between the cabin wall and the outer skin, within cavities in the floor between the cabin and the hold or in the hold itself, hollow bodies filled with an extinguishing agent such as nitrogen, the volume of which can expand in order to displace air in the area of the hollow body.

DE 10 2004 029 655 A1 and WO 2005/030338 A1 describe plug-in modules for computers or racks in which computer systems are held, wherein these plug-in modules have sensors with which smoke fumes can be detected. In addition, the plug-in modules have a reservoir for an extinguishing agent, wherein the extinguishing agent is released whenever the presence of smoke fumes is detected by the sensors.

Finally, DE 10 2009 023 422 A1 discloses that an extinguishing device which comprises a monitoring device and a triggering device is integrated in an electronic switching assembly. The monitoring device can trigger the extinguishing device, wherein the latter then discharges an extinguishing agent into the surrounding area. The monitoring device may in this case have a smoke fume sensor, a temperature sensor or an optical sensor. It is also disclosed that an indicating device which, after triggering of the extinguishing device, permanently indicates this is provided.

On the basis of the prior art, an object of the disclosure herein is to provide an extinguishing device and a system comprising extinguishing devices, wherein the extinguishing devices can be fitted in an easy way at any desired positions in an aircraft and which also make it possible that, in the event of the triggering of a device, the extinguishing device that has been triggered can be easily located.

SUMMARY

According to a first aspect of the disclosure herein, this object is achieved by an extinguishing device which is designed in a preferred way for fitting on the housing of an electrical unit, a monument in the cabin of an aircraft or in a cavity in the structure of an aircraft. However, the disclosure herein is not restricted to the extinguishing device being designed for being fitted in this way.

According to the disclosure herein, the extinguishing device has a base element, which can be formed in a preferred way as a housing, in particular a closed housing. However, it is also conceivable that the base element is formed as a shallow holder. According to the disclosure herein, the base element is designed to be held in a holder, such as for example a clamping device, which may also have contacts for supplying energy and transmitting signals from and to the extinguishing device. The holder may in turn be designed in a preferred embodiment to be fastened on the housing of an electrical unit, on the monument in the cabin of an aircraft or in the cavity in the structure of an aircraft.

According to the disclosure herein, an extinguishing agent container, which has a closed casing and is designed to hold an extinguishing agent, is provided on the base element. In a preferred embodiment, the extinguishing agent container may be designed in one piece with the base element in such a way that the casing of the extinguishing agent container is an integral part of the base element. However, it is also possible in another preferred embodiment that the extinguishing agent container is formed as a component that is separate from the base element but mounted on it. The extinguishing agent container is formed in particular for holding an extinguishing agent for example in the form of nitrogen or 3M® Novec® 1230 (Non Halon). In a preferred way, the extinguishing agent is intended to displace the oxygen present in the surrounding area of the extinguishing device, so as to remove the basis for a fire occurring in the surrounding area. In addition, the extinguishing agent may also have a cooling effect. The two initially mentioned examples of extinguishing agents are linked by the advantage that they do not damage electrical components when they come into contact with them.

The extinguishing device according to the disclosure herein also has a triggering device, which is connected to the extinguishing agent container and is designed to act on the casing of the extinguishing agent container in response to receiving a triggering signal in such a way that an extinguishing agent contained therein is released into the surrounding area of the extinguishing device. The triggering device is therefore designed in such a way that, when a triggering signal which is generated by a monitoring device that is either likewise fitted on the base element or provided away from it is received, the closed casing of the extinguishing agent container is opened. In a preferred embodiment, this may happen by the casing being at least partially destroyed. It is however also possible that, when it receives the triggering signal, the triggering device causes an opening in the casing to be exposed. Preferred exemplary embodiments of this are also explained below.

Finally, the extinguishing device according to the disclosure herein has a data transmission device, which is mounted on the base element, has a data store in which an identifier unique to the extinguishing device is stored and is connected to the triggering device for transmitting signals. The data transmission device is also designed to send a warning signal via a network to a control unit in response to the triggering device receiving the triggering signal, wherein the warning signal contains the identifier. The data transmission device therefore achieves the effect that, whenever the extinguishing device is triggered in such a way that the extinguishing agent is discharged to the surrounding area, a signal, to be specific the warning signal, is also generated and transmitted, the signal also including an identifier that enables the control unit to which the warning signal is sent to output at which position, for example in the aircraft that is provided with a multiplicity of extinguishing devices according to the disclosure herein, the discharging of extinguishing agent has taken place. On this basis, a multiplicity of further measures can then be initiated, in particular the generation of an alarm, including the position of the possible fire. It is in this case possible according to the disclosure herein that the identifier stored in the data store already contains information about the position at which the extinguishing device is fitted. It is equally possible in an alternative preferred embodiment that the data store only contains a unique identification in the form of a code unique to the extinguishing device and that the control unit is provided with a further store, in which a table that contains the matching of the codes to the positions of the extinguishing devices is stored.

The transmission of the warning signal from the extinguishing devices to the control unit may take place in a wire-bound manner, for example via a bus system. It is however also possible that the transmission of the warning signal takes place via a radio network, which involves the advantage that this cannot be as easily affected than is the case for a wire-bound network by a fire in the surrounding area of the extinguishing agent in the case of which the discharge of extinguishing agent has been triggered and from the data transmission device of which the warning signal is transmitted.

The extinguishing device according to the disclosure herein therefore allows the setting up of a system in which, because of the appropriately designed base element, the extinguishing devices are fitted in preassembled holders. Consequently, the extinguishing devices can be standardized and formed independently of the position at which they are to be used. Furthermore, when they are triggered, the extinguishing devices transmit a warning signal that allows their position to be deduced. Consequently, a control unit which is part of a system of extinguishing devices according to the disclosure herein is enabled to output a signal, for example an alarm or just an indication, which contains information about the position of a possible fire. In the case of the extinguishing devices according to the disclosure herein, it is avoided that they have to be individually adapted to the position at which they are used, for example in an aircraft. Rather, standardized extinguishing devices can be used.

In a preferred embodiment, the extinguishing device according to the disclosure herein is designed in such a way that it has at least one monitoring device, which is connected to the triggering device for transmitting the triggering signal to the triggering device and is designed in such a way as to monitor a parameter of the surrounding area, wherein the monitoring device transmits a triggering signal to the triggering device if the monitored parameter of the surrounding area lies outside a prescribed range. Therefore at least one such parameter of the surrounding area associated with the outbreak of a fire in the surrounding area if it changes can be monitored by the monitoring device. This may be for example the temperature, pressure or else light absorption by the atmosphere in the surrounding area of the extinguishing device. Other examples of parameters of the surrounding area are also explained below.

In a preferred embodiment, the monitoring device is mounted on the base element. This has the advantage that the extinguishing device can be assembled as a single component and is fully functional. It is however alternatively also possible that the monitoring device is provided away from the base element. This makes it possible that the monitoring device can be arranged particularly close to a component that can easily ignite without it being necessary for the holder with the extinguishing device also to be fitted close to the component in question.

In a preferred way, the monitoring device may be formed

- to detect the temperature in the surrounding area of the monitoring device and to transmit the triggering signal to the triggering device whenever the temperature exceeds a threshold value, and/or
- to detect the pressure in the surrounding area of the monitoring device and to transmit the triggering signal to the triggering device whenever the pressure exceeds a threshold value, and/or
- to detect the concentration of smoke fumes in the surrounding area of the monitoring device and to transmit the triggering signal to the triggering device whenever the concentration of the smoke fumes exceeds a threshold value, and/or
- the monitoring device is formed in such a way as to detect the absorption of light along an optical path and to transmit the triggering signal to the triggering device whenever the absorption exceeds a threshold value.

These individual or optionally also combined possibilities of detecting parameters of the surrounding area allow reliable detection of a fire or of conditions in which the occurrence of fire is likely. However, the disclosure herein is not restricted to the aforementioned embodiments of monitoring devices.

The triggering device of the extinguishing device according to the disclosure herein may be constructed in a preferred way according to one of the alternatives described below:

- the triggering device has a heating resistor, which is arranged inside the extinguishing agent container, wherein the triggering device is designed in such a way that the triggering signal causes a current through the heating resistor with a current intensity which is chosen such that the casing of the extinguishing agent container bursts, or
- the triggering device has a closure element, which is arranged in the casing of the extinguishing agent container and is inserted in an opening in the casing, wherein an electrical conductor is provided between the rim of the opening and the closure element and wherein the triggering device is designed in such a way that the triggering signal causes a current through the electrical conductor with a current intensity which is chosen such that the closure element is removed from the opening, or
- the triggering device has an arrangement of nano valves provided in the casing of the extinguishing agent container, wherein the arrangement of nano valves is connected to the triggering device via a signal connection, wherein the triggering device is designed in such a way that the triggering signal causes a control signal which is directed via the signal connection to the arrangement of nano valves, and wherein the arrangement of nano valves is designed in such a way that the control signal directed via the signal connection to the arrangement of nano valves causes the nano valves to open, or
- the triggering device has an arrangement of nano valves provided in the casing of the extinguishing agent container, wherein the triggering device is designed in such a way that the triggering signal causes a current through the arrangement of nano valves with a current intensity which is chosen such that the nano valves open.

Such designs of triggering devices have proven to be particularly expedient and reliable. Nevertheless, the disclosure herein is not restricted to the aforementioned embodiments of triggering devices.

In the case of the aforementioned designs in which an arrangement of nano valves is used, it is accordingly a preferred embodiment if the nano valves are opened by a current that is passed through the arrangement. However, this is only one preferred embodiment of the more general concept that the triggering device generally generates a control signal which is passed to the arrangement of nano valves and causes the nano valves to open. Furthermore, all of the aforementioned embodiments of triggering devices may be combined with one or more of the aforementioned embodiments of monitoring devices. This applies in particular to the embodiments of triggering devices that use nano valves.

It is also preferred if the triggering device has a switch, wherein the triggering device is designed such that the reception of the triggering signal causes the switch to be switched over from an inactive position into a triggering position, and wherein the data transmission device is designed to detect the position of the switch and to emit the warning signal only when the switch is in the triggering position. In the case of this design, activation of the emission of the warning signal is realized in a particularly easy way.

If the switch is also formed such that, after switching over from the inactive position into the triggering position, the switch stays in the triggering position even when the triggering signal is no longer present, the switch can be used in an easy way to trigger the warning signal permanently, even when the triggering signal is no longer present. In particular, in addition to the warning signal, the switch can then be used to activate an optical indicating device such as an LED, by which it can be easily seen from the extinguishing device itself that it has been triggered.

In a further preferred embodiment, first contacts are provided on the base element, for interacting with first contacts on the holder, wherein the first contacts on the base element are connected to the data transmission device and/or the monitoring device and/or the triggering device in order to supply them with an electrical voltage. It is in this case also possible that the extinguishing device has along with the previously described energy supply an energy store, for example in the form of a battery or some other type of energy store, for example a capacitor ("Super Cap"), in order to ensure the function of the extinguishing device even when the energy supply via the first contacts fails. The extinguishing device can therefore be supplied both via the contacts and via an internal, preferably rechargeable battery.

It is also preferred if, for a wire-bound transmission of the warning signal, at least one second contact is provided on the base element, for interacting with at least one second contact on the holder, wherein the second contact on the base element is connected to the data transmission device.

According to a further aspect of the disclosure herein, the above object is achieved by a combination of an extinguishing device as described above and a holder, wherein the holder is designed to be fastened on the housing of an electrical unit, on the monument in the cabin of an aircraft or in the cavity in the structure of an aircraft, and wherein the holder is designed such that the extinguishing device and the holder can be releasably connected to one another. As already explained, this combination achieves the effect that a multiplicity of standard extinguishing devices can be assembled in an easy way on holders at different positions, for example in an aircraft, and that it is thereby possible without any great technical effort to set up a system which makes it possible to establish the position at which an extinguishing device has been triggered.

In particular, the holders of the combination may be designed such that first contacts are provided on the holder, arranged and formed in such a way that the first contacts on the holder lie against the first contacts on the base element when the extinguishing device is connected to the holder. In this way, the energy supply to the extinguishing devices can be ensured.

Furthermore, in a further preferred embodiment of the combination, the holders may have a second contact on them, arranged and formed in such a way that the at least one second contact on the holder lies against the at least one second contact on the base element when the extinguishing device is connected to the holder. This allows a wire-bound transmission of the warning signal to be realized.

Furthermore, the above object is achieved by a system comprising a multiplicity of extinguishing devices as described above and a control unit, wherein the control unit is designed to receive a warning signal emitted by the data transmission device of one of the extinguishing devices, and wherein the control unit is designed to evaluate the warning signal and output the identifier.

Finally, the above object is also achieved by a system comprising a multiplicity of combinations of an extinguishing device and a holder as described above and a control unit, wherein the control unit is designed to receive a warning signal emitted by the data transmission device of one of the extinguishing devices of the combinations, and wherein the control unit is designed to evaluate the warning signal and output the identifier.

The advantages that can be achieved with the systems described above have already been explained in connection with the extinguishing device according to the disclosure herein.

BRIEF DESCRIPTION OF THE DRAWINGS

The disclosure herein is explained below on the basis of a drawing, which merely shows preferred exemplary embodiments and in which.

DETAILED DESCRIPTION

Figure 1:
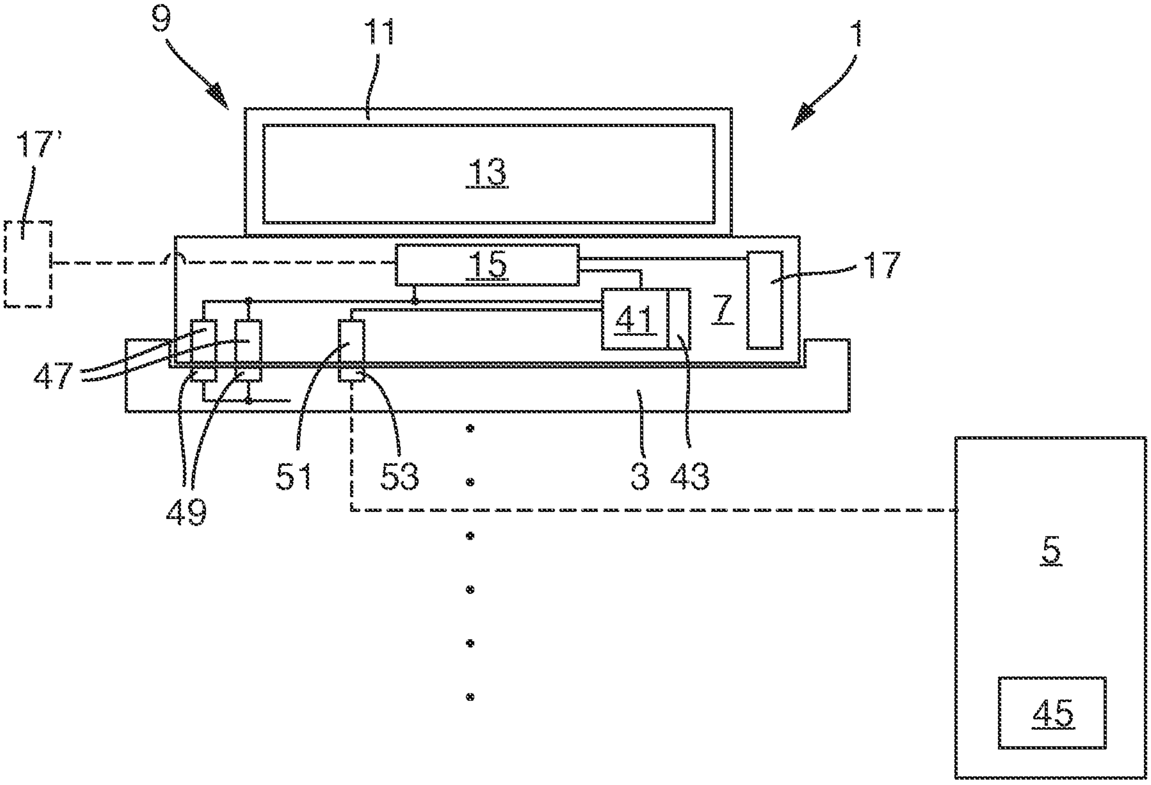
FIG. 1 shows a schematic representation of an exemplary embodiment of a system according to the disclosure herein comprising combinations of extinguishing devices according to the disclosure herein and holders and also a control unit.

FIG. 1 shows an exemplary embodiment of a system according to the disclosure herein comprising a multiplicity of combinations of an embodiment of an extinguishing device 1 and a holder 3 and also a control unit 5.

The embodiment of an extinguishing device 1 according to the disclosure herein has a base element 7, which is only schematically represented in FIG. 1 and which is designed to be fitted, preferably releasably, on the holder 3. Provided for this purpose on the base element 7 may be latching elements (not shown), which engage with counter latching elements on the holder 3. The base element 7 may be formed as a housing in which the further components of the extinguishing device 1 are held, but also as a support that is not closed.

Also provided on the base element 7 of the extinguishing device 1 is an extinguishing agent container 9, which has a closed casing 11 and is designed for holding an extinguishing agent. In a preferred embodiment, the extinguishing agent container 9 may be designed in one piece with the base element 7 in such a way that the casing 11 is an integral part of the base element 7. However, it is also possible, as schematically represented in FIG. 1, that the casing 11 of the extinguishing agent container 9 is formed as a component that is separate from the base element 7 but mounted on it.

The extinguishing agent container 9 has a holding volume 13, which is enclosed by the casing 11 and is formed for the purpose of holding an extinguishing agent, for example in the form of nitrogen or 3M® Novec® 1230 (Non Halon). In particular, the holding volume 13 may be provided with an extinguishing agent which is of such a nature that it displaces the oxygen present in the surrounding area of the extinguishing device 1 when it is released through an opening in the casing 11. This removes the basis for a fire in the surrounding area. In addition, the extinguishing agent may also have a cooling effect. The two aforementioned examples of extinguishing agents are linked by the advantage that they do not damage electrical components when they come into contact with them.

The extinguishing device 1 according to the disclosure herein also has a triggering device 15, which is connected to the extinguishing agent container 9 and is designed to act on the casing 11 of the extinguishing agent container 9 in response to receiving a triggering signal in such a way that extinguishing agent that is held in the holding volume 13 is released into the surrounding area of the extinguishing device 1. In the exemplary embodiment schematically represented in FIG. 1, the triggering device 15 is directly fitted on the casing 11 of the extinguishing agent container 9. However, it is also possible that the triggering device 15 or at least part of it is provided in the holding volume 13 of the extinguishing agent container 9.

The triggering device 15 is designed in such a way that, when a triggering signal which is generated by a monitoring device 17, 17', still to be described in detail below, that is either likewise fitted on the base element or provided away from it is received, the closed casing 11 of the extinguishing agent container 9 is opened.

Figure 2:
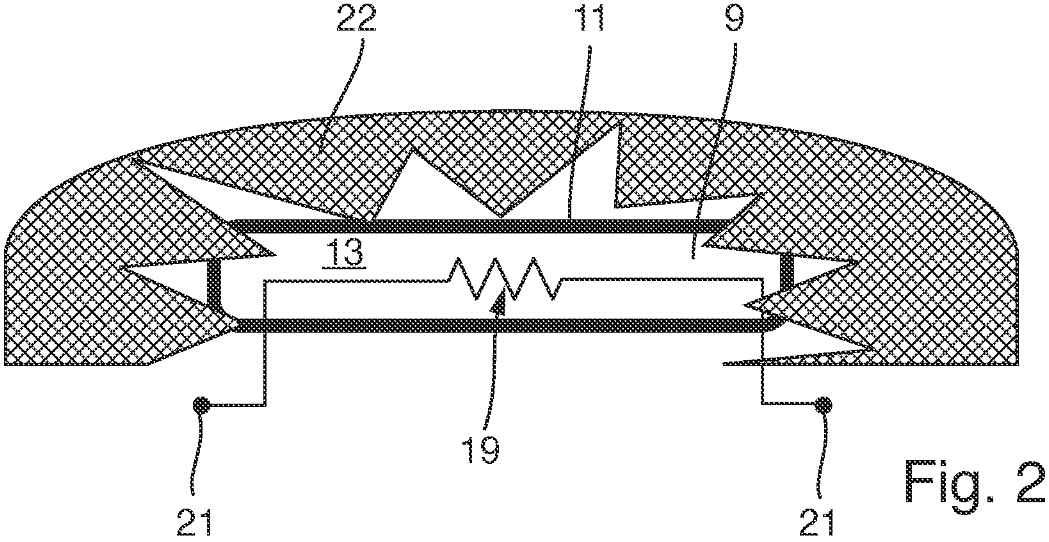
FIG. 2 shows a schematic representation of a first exemplary embodiment of an extinguishing agent container with part of a triggering device.

In a preferred embodiment, this may happen by the casing 11 being at least partially destroyed. It is however also possible that, when it receives the triggering signal, the triggering device 15 causes an opening in the casing 11 to be exposed. Preferred exemplary embodiments of the triggering device 15 are shown in FIGS. 2 to 4 and are explained below:

As shown in FIG. 2, an exemplary embodiment of a triggering device 15 has a heating resistor 19, which is arranged inside, that is to say in the holding volume 13, of the extinguishing agent container 9. The triggering device 15 is also designed in such a way that the triggering signal causes a current which is passed through the heating resistor 19 via contacts 21. In this case, the current intensity of the current through the heating resistor 19 is chosen such that the casing 11 of the extinguishing agent container 9 bursts, and as a result the extinguishing agent is released. In the exemplary embodiment shown here, the casing 11 is also surrounded by a wire cage 22, in order to prevent fragments of the casing 11 from getting into the surrounding area of the extinguishing device 1.

Figure 3:
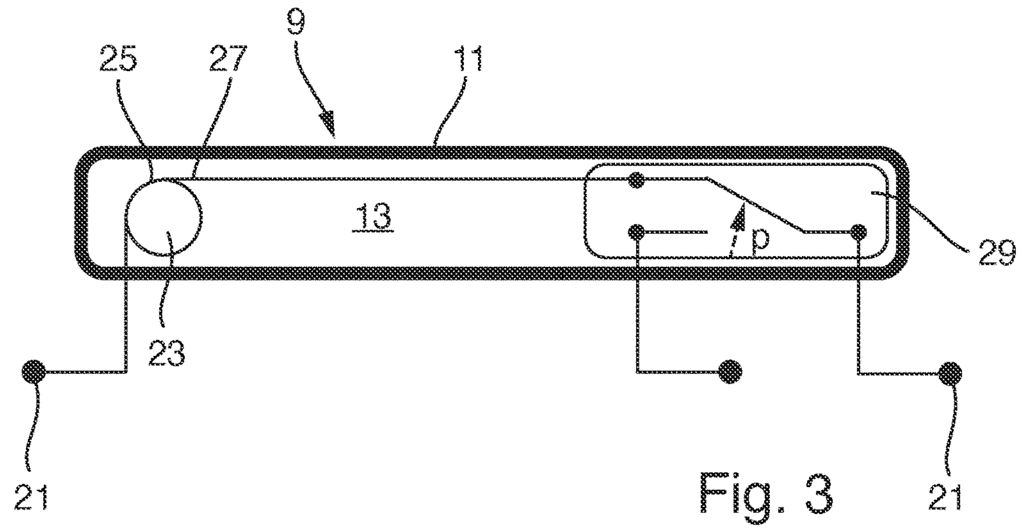
FIG. 3 shows a schematic representation of a second exemplary embodiment of an extinguishing agent container with part of a triggering device.
Figure 4:
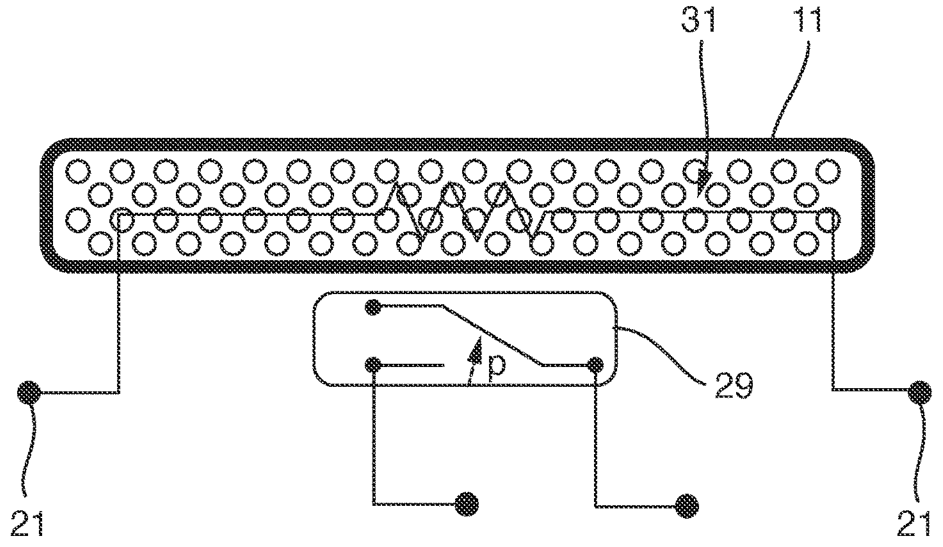
FIG. 4 shows a schematic representation of a second exemplary embodiment of an extinguishing agent container with part of a triggering device.

In the alternative embodiment of a triggering device 15 that is shown in FIG. 3, it has a closure element 23, which is arranged in the casing 11 of the extinguishing agent container 9 and is inserted in an opening 25 in the casing 11. Provided between the rim of the opening 25 and the closure element 23 is an electrical conductor 27, to which a current can be applied via the contacts 21 when the switch 29 has been brought into the triggering position shown in FIG. 3, which takes place by a triggering signal generated by the monitoring device 17, 17'.

The current intensity of the current then flowing through the electrical conductor 27 is chosen such that the closure element 23 is released from the opening 25. Extinguishing agent in the extinguishing agent container 9 can leave into the surrounding area through the opening 25 then exposed.

The switch 29 may also assume an inactive position, in which the contacts 21 are not connected to one another via the conductor 27. The switch 29 is preferably also designed such that, after switching over from the inactive position (which is also monitored) into the triggering position shown in FIG. 3, the switch 29 stays in the triggering position even when the triggering signal is no longer present. As a result, the switch 29 can be used in an easy way to trigger a warning signal permanently, as also described in detail below, even when the triggering signal is no longer present. Furthermore, the switch 29 can then be used to additionally activate an optical indicating device (not shown) such as an LED, by which it can be easily seen from the extinguishing device 1 itself that it has been triggered. Such a switch 29 which, after switching over into the triggering position, stays in the triggering position irrespective of the further presence of the triggering signal may also be used in the way described in the case of other embodiments of a triggering device described in connection with FIG. 3.

In a further alternative embodiment of a triggering device 15, which is shown in FIG. 4, an arrangement of nano valves 31 is provided in the casing 11 of the extinguishing agent container 9. The triggering device 15 is designed in such a way that the switch 29 is switched by the triggering signal into the triggering position shown in FIG. 4, whereby a current is passed through the conductor 27 via the contacts 21, and thereby through the arrangement of nano valves 31. The current intensity is in this case chosen such that the nano valves open and consequently the extinguishing agent is released from the holding volume 13. Also in the case of this exemplary embodiment, the switch 29 is designed in the way already described in connection with FIG. 3, so that it is used for the purpose of permanently activating an optical indicating device (not shown) on the base element 7 when a triggering signal has been received by the triggering device 15. This embodiment is however only one specific embodiment of the more general concept that the triggering device 15 generally generates a control signal which is passed to the arrangement of nano valves 31 via a signal connection and causes the nano valves 31 to open.

As also shown in FIG. 1, the extinguishing device 1 has a monitoring device 17, 17', which is connected to the triggering device 15 for transmitting a triggering signal to the triggering device 15. The monitoring device 17, 17' may be mounted directly on the base element 7, as is shown in FIG. 1 for the monitoring device 17. However, it is also possible that a monitoring device 17' is provided away from the base element 7 with the extinguishing agent container 9.

In any event, the monitoring device 17, 17' is designed to monitor a parameter of the surrounding area from which it can be deduced whether there is a fire in the surrounding area or at least the outbreak of a fire is very likely. If the monitored parameter of the surrounding area in question lies outside a prescribed range, the monitoring device 17, 17' transmits a triggering signal to the triggering device 15, which as described above causes the extinguishing agent to be released from the extinguishing agent container 9 into the surrounding area.

Therefore at least one such parameter of the surrounding area associated with the outbreak of a fire in the surrounding area of the extinguishing device 1 if it changes is monitored by the monitoring device 17, 17'. This may be for example the temperature, pressure or else light absorption by the atmosphere in the surrounding area of the extinguishing device 1. In particular, the monitoring device 17, 17' may be designed

Figure 5:
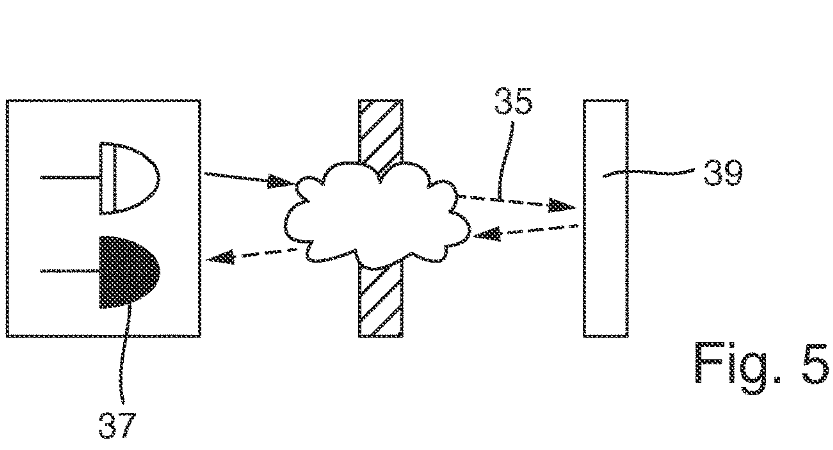
FIG. 5 shows a schematic representation of the setup of an exemplary embodiment of part of a monitoring device of an extinguishing device according to the disclosure herein.

- to detect the temperature in the surrounding area of the monitoring device 17, 17' and to transmit the triggering signal to the triggering device 15 whenever the temperature exceeds a threshold value, and/or
- to detect the pressure in the surrounding area of the monitoring device 17, 17' and to transmit the triggering signal to the triggering device 15 whenever the pressure exceeds a threshold value, and/or
- to detect the concentration of smoke fumes in the surrounding area of the monitoring device 17, 17' and to transmit the triggering signal to the triggering device 15 whenever the concentration of the smoke fumes exceeds a threshold value, and/or
- the monitoring device 17, 17', as it is schematically represented in FIG. 5, is formed in such a way as to detect the absorption of light along an optical path 35 by an arrangement of diodes 37 and a reflector 39, wherein the triggering signal is transmitted to the triggering device 15 whenever the absorption exceeds a threshold value.

Finally, the extinguishing device 1 according to the disclosure herein has a data transmission device 41, which is mounted on the base element 7 and has a data store 43 in which an identifier unique to the extinguishing device 1 is stored. The data transmission device 41 is connected to the triggering device 15 for transmitting signals and is designed to send a warning signal via a network to the control unit 5 in response to the triggering device 15 receiving the triggering signal. In this case, the warning signal contains the identifier, so that the control unit 5 to which the warning signal is sent outputs at which position, for example in an aircraft that is provided with a multiplicity of extinguishing devices 1 together with holders 3, the discharging of extinguishing agent has taken place. On this basis, a multiplicity of further measures can then be initiated, in particular the generation of an alarm, including the position of the possible fire. It may be in this case that the identifier stored in the data store 43 contains information about the position at which the extinguishing device 1 is fitted. It is equally also possible that the data store 43 only contains a unique identification in the form of a code unique to the extinguishing device 1 and that the control unit 5 is provided with a further data store 45, in which a table that contains the matching of the codes to the positions of the extinguishing devices 1 is stored.

Finally, in the case of the exemplary embodiment shown here, first contacts 47 are provided on the base element 7, for interacting with first contacts 49 on the holder 3, when the extinguishing device is connected to the holder 3. As can be seen from FIG. 1, the first contacts 47 on the base element 7 are connected to the data transmission device, the monitoring device 17 and the triggering device 15 in order to supply them with an electrical voltage. It is however possible that the extinguishing device 1 has along with the previously described energy supply an energy store, for example in the form of a battery or some other type of energy store, for example a capacitor ("Super Cap"), in order to ensure the function of the extinguishing device 1 even when the energy supply via the first contacts 47, 49 fails. The extinguishing device can therefore be supplied both via the first contacts 47, 49 and via an internal, preferably rechargeable battery. Furthermore, for a wire-bound transmission of the warning signal to the control unit 5, a second contact 51 is provided on the base element 7, for interacting with a second contact 53 on the holder 3, wherein the second contact 51 on the base element 7 is connected to the data transmission device 41. Even if a wire-bound transmission of the warning signal is described here, it is possible alternatively or in parallel with this also to transfer the warning signal to the control unit 5 in a wireless manner.

With the previously described exemplary embodiment of a system comprising combinations of extinguishing devices 1 and holders 3 and also a control unit 5, standardized extinguishing devices 1 can be used irrespective of the position at which they are to be used. Furthermore, when they are triggered, the extinguishing devices 1 transmit a warning signal that allows their position to be deduced. This enables the control unit 5 to output a signal, for example an alarm or just an indication, which contains information about the position of a possible fire. In the case of the extinguishing devices 1 according to the disclosure herein, it is specifically avoided that they have to be individually adapted to the position at which they are used, for example in an aircraft. Rather, standardized extinguishing devices 1 can be used.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF DESIGNATIONS

1 Extinguishing device
3 Holder
5 Control unit
7 Base element
5
9 Extinguishing agent container
11 Casing
13 Holding volume

15 Triggering device
17, 17' Monitoring device
19 Heating resistor
21 Contacts
22 Wire cage
23 Closure element
25 Opening
27 Electrical conductor
29 Switch
31 Nano valves
33 Monitoring device
35 Optical path
37 Diodes
39 Reflector
41 Data transmission device
43 Data store
45 Data store
47 First contacts
49 First contacts—holder
51 Second contact
53 Second contact—holder

The invention claimed is:

1. An extinguishing device for fitting on a housing of an electrical unit that is on a monument in aircraft cabin or in a cavity in a structure of an aircraft, the extinguishing device comprising:

a base element for being held in a holder which is configured to be fastened on the housing of the electrical unit;

an extinguishing agent container that comprises a closed casing, is configured to hold an extinguishing agent within the closed casing, and is provided on the base element;

a triggering device connected to the extinguishing agent container and configured to act on the closed casing of the extinguishing agent container, such that the closed casing is opened in response to receiving a triggering signal, the act of opening the closed casing causing a release of the extinguishing agent in the extinguishing agent container into a surrounding area of the extinguishing device; and a data transmission device that is mounted on the base element, comprises a data store, in which an identifier unique to the extinguishing device is stored, and is connected to the triggering device for transmitting signals;

wherein the data transmission device is configured to send a warning signal via a network to a controller in response to the triggering device receiving the triggering signal, wherein the warning signal contains the identifier;

wherein the closed casing fully encloses the extinguishing agent before the triggering device acts on the closed casing to cause the release of the extinguishing agent into the surrounding area of the extinguishing device;

wherein the triggering device has a heater, which is inside the extinguishing agent container; and wherein the heater is configured to cause the closed casing of the extinguishing agent container to burst.

2. The extinguishing device according to claim 1, comprising:

a monitor connected to the triggering device;

wherein the monitor is configured for transmitting the triggering signal to the triggering device;

wherein the monitor is configured to monitor a parameter of the surrounding area; and wherein the monitor is configured to transmit the triggering signal to the triggering device when the parameter of the surrounding area is outside a prescribed range.

3. The extinguishing device according to claim 2, wherein:

the monitor is mounted on the base element; or the monitor is away from the base element.

4. The extinguishing device according to claim 2, wherein:

the parameter is a temperature in the surrounding area; and the monitor is configured to transmit the triggering signal to the triggering device when the temperature exceeds a threshold temperature value.

5. The extinguishing device according to claim 2, wherein:

the parameter is a pressure in the surrounding area; and the monitor is configured to transmit the triggering signal to the triggering device when the pressure exceeds a threshold pressure value.

6. The extinguishing device according to claim 2, wherein:

the parameter is a concentration of smoke fumes in the surrounding area; and the monitor is configured to transmit the triggering signal to the triggering device when the concentration of the smoke fumes exceeds a threshold concentration value.

7. The extinguishing device according to claim 2, wherein:

the parameter is an absorption of light along an optical path; and the monitor is configured to transmit the triggering signal to the triggering device when the absorption of light along the optical path exceeds a threshold absorption value.

8. The extinguishing device according to claim 1, wherein:

the heater has a heating resistor; and the triggering device is configured such that the triggering signal causes a flow of an electric current through the heating resistor, the flow of the electric current having a current intensity sufficient to cause the closed casing of the extinguishing agent container to burst.

9. The extinguishing device according to claim 1, wherein:

first contacts are on the base element;

the first contacts on the base element are configured for interacting with first contacts on the holder; and the first contacts on the base element are connected to:

the data transmission device to supply the data transmission device with an electrical voltage; and/or the monitor to supply the monitor with the electrical voltage; and/or the triggering device to supply the triggering device with the electrical voltage.

10. The extinguishing device according to claim 9, wherein:

at least one second contact is on the base element;

the at least one second contact on the base element is configured for interacting with at least one second contact on the holder; and the at least one second contact on the base element is connected to the data transmission device to emit the warning signal via the at least one second contact.

11. A combination comprising:

a holder; and an extinguishing device according to claim 1;

wherein the holder is configured to be fastened on the housing of the electrical unit; and wherein the holder is configured such that the extinguishing device can be releasably connected to the holder.

12. The combination according to claim 11, wherein:

first contacts are on the base element;

first contacts are on the holder;

the first contacts on the base element are configured for interacting with the first contacts on the holder;

the first contacts on the base element are connected to:

the data transmission device to supply the data transmission device with an electrical voltage; and/or the monitor to supply the monitor with the electrical voltage; and/or the triggering device to supply the triggering device with the electrical voltage; and when the extinguishing device is connected to the holder, the first contacts are on the holder such that the first contacts on the holder lie against the first contacts on the base element.

13. The combination according to claim 11, wherein:

first contacts are on the base element;

first contacts are on the holder;

the first contacts on the base element are configured for interacting with the first contacts on the holder;

the first contacts on the base element are connected to:

the data transmission device to supply the data transmission device with an electrical voltage; and/or the monitor to supply the monitor with the electrical voltage; and/or the triggering device to supply the triggering device with the electrical voltage;

at least one second contact is on the base element;

at least one second contact is on the holder; and when the extinguishing device is connected to the holder, the at least one second contact on the holder lies against the at least one second contact on the base element.

14. The extinguishing device according to claim 1, wherein:

the extinguishing agent container has a holding volume, which is enclosed by the closed casing and formed for the purpose of holding the extinguishing agent;

the extinguishing agent container is formed such that no portion of the holding volume is internal to the base element; and the closed casing is formed as one piece with the base element.

15. A system comprising:

a controller; and a multiplicity of extinguishing devices according to claim 1;

wherein the controller is configured to receive the warning signal emitted by the data transmission device of any of the extinguishing devices; and wherein the controller is configured to evaluate the warning signal and output the identifier associated with the extinguishing device from which the warning signal is emitted.

16. A system comprising:

a controller; and a multiplicity of combinations according to claim 11; and wherein the controller is configured to receive the warning signal emitted by the data transmission device of the extinguishing device of any of the combinations; and wherein the controller is configured to evaluate the warning signal and output the identifier associated with the extinguishing device from which the warning signal is emitted.

* * * * *